(12) United States Patent
Won et al.

(10) Patent No.: US 8,942,254 B2
(45) Date of Patent: Jan. 27, 2015

(54) METHOD FOR TRANSMITTING/RECEIVING DATA WHILE SUPPORTING SCALABILITY IN COMMUNICATION SYSTEM

(75) Inventors: Eun-Tae Won, Seoul (KR); Jong-Hoon Ann, Suwon-si (KR); Jae-Seung Son, Suwon-si (KR)

(73) Assignee: Samsung Electronics Co., Ltd., Yeongtong-gu, Suwon-si, Gyeonggi-do (KR)

( * ) Notice: Subject to any disclaimer, the term of this patent is extended or adjusted under 35 U.S.C. 154(b) by 610 days.

(21) Appl. No.: 12/257,441

(22) Filed: Oct. 24, 2008

(65) Prior Publication Data

US 2009/0109913 A1  Apr. 30, 2009

(30) Foreign Application Priority Data

Oct. 24, 2007  (KR) .................. 10-2007-0107296

(51) Int. Cl.
*H04J 3/16* (2006.01)
*H04J 3/22* (2006.01)
*H04W 72/08* (2009.01)

(52) U.S. Cl.
CPC ................................ *H04W 72/087* (2013.01)
USPC ......................................................... 370/465

(58) Field of Classification Search
USPC ......................................................... 370/465
See application file for complete search history.

(56) References Cited

U.S. PATENT DOCUMENTS

| | | | |
|---|---|---|---|
| 6,947,421 B1 | 9/2005 | Glingener et al. | |
| 7,145,956 B2* | 12/2006 | Koifman | 375/260 |
| 7,626,966 B1* | 12/2009 | Ruiter et al. | 370/337 |
| 2003/0084283 A1* | 5/2003 | Pixton | 713/163 |
| 2003/0091001 A1* | 5/2003 | Watanabe | 370/236 |
| 2005/0002671 A1* | 1/2005 | Smith et al. | 398/83 |
| 2005/0080928 A1* | 4/2005 | Beverly et al. | 709/245 |
| 2006/0176861 A1* | 8/2006 | Schmidt | 370/337 |
| 2007/0008922 A1* | 1/2007 | Abhishek et al. | 370/329 |
| 2007/0104138 A1* | 5/2007 | Rudolf et al. | 370/329 |
| 2007/0298709 A1* | 12/2007 | Sinnarajah et al. | 455/3.05 |
| 2008/0069253 A1* | 3/2008 | Tzannes | 375/260 |
| 2009/0103635 A1* | 4/2009 | Pahalawatta | 375/240.27 |
| 2011/0110661 A1 | 5/2011 | Grubor et al. | |

FOREIGN PATENT DOCUMENTS

WO    2006/136126 A1    12/2006

* cited by examiner

*Primary Examiner* — Huy D Vu
*Assistant Examiner* — Adnan Baig
(74) *Attorney, Agent, or Firm* — Cha & Reiter, LLC

(57) ABSTRACT

A method for transmitting/receiving data between first and second terminals in which data can be transmitted flexibly in each particular situation, i.e. according to the network environment of terminals between which visible light communication occurs, including the type and characteristics of transmitted data. The method includes the steps of: (a) connecting a communication link between a first terminal supposed to transmit data and a second terminal supposed to receive data; (b) determining a data transmission rate to be used for data communication; (c) allocating a transmission channel of a specific band within a frequency band enabling wireless communication; (d) establishing a data transmission environment based on consideration of the transmission rate and the transmission channel; and (e) conducting data communication between the first and second terminals with reference to the data transmission environment.

11 Claims, 3 Drawing Sheets

METHOD FOR TRANSMITTING/RECEIVING DATA WHILE SUPPORTING SCALABILITY IN COMMUNICATION SYSTEM

CLAIM OF PRIORITY

This application claims the benefit of an application entitled "Method for Transmitting/Receiving Data While Supporting Scalability in Communication System" filed in the Korean Intellectual Property Office on Oct. 24, 2007 and assigned Serial No. 2007-0107296, the contents of which are hereby incorporated by reference in its entirety.

BACKGROUND OF THE INVENTION

1. Field of the Invention

The present invention relates to a method for transmitting/receiving data. More particularly, the present invention relates to a method for supporting scalability regarding a transmission rate necessary to transmit data.

2. Description of the Related Art

FIG. 1 conceptually shows devices connected via a prior art wireless communication network. Referring to FIG. 1, the devices connected to transmit/receive data for wireless communication may have a master-slave relationship. For example, the devices shown in FIG. 1 includes a first terminal 100 as the master device that transmits data, as well as a PDA 110, a printer 120, and a PC 130, which act as slave devices, and receive data from the master. In the process of connecting to the slave devices via a visible light communication network, the first terminal 100 identifies the type of device of each slave 110, 120 and 130 and determines the data transmission rate according to the particular type of the slave device.

For example, when a slave device identified by the first terminal 100 comprises a printer 120, the transmission rate is determined to be (in this example) 128 kbps. In the case of a PDA 110, the transmission rate is determined to be 1 Mbps, and in the case of a PC 130, the transmission rate is determined to be 10 Mbps. The master device then transmits data at the data transmission rate determined for each type of slave device. In other words, each type of slave device has a fixed transmission rate, at which data is transmitted.

Meanwhile, it is not always the case that slave devices of the same type receive and process the same amount of data from the master device. For example, according to the circumstance, a large amount of data may need to be received from the master device at a high rate, or a small amount of data needs to be received at a low rate. However, according to the above-mentioned conventional method of transmitting data at a transmission rate fixed for each slave device type, it is difficult to transmit data flexibly at a transmission rate changed according to the situation.

SUMMARY OF THE INVENTION

Accordingly, the present invention provides a method for recognizing a transmission rate necessary for transmission of data between devices transmitting/receiving data and flexibly transmitting data at the recognized transmission rate.

In accordance with an exemplary aspect of the present invention, there is provided a method for transmitting/receiving data between first and second terminals, the method may include the steps of (a) connecting (establishing) a communication link between a first terminal for at least transmitting data and a second terminal for at least receiving data; (b) determining a data transmission rate to be used for data communication; (c) allocating a transmission channel of a specific band within a frequency band enabling wireless communication; (d) establishing a data transmission environment based on consideration of the transmission rate and the transmission channel; and (e) conducting data communication between the first and second terminals with reference to the data transmission environment.

With regard to the aforementioned steps, step (a) may include the steps of broadcasting a frame for searching for a second terminal supposed to receive data by the first terminal; receiving the frame by the second terminal and sending a profile of the second terminal to the first terminal in response to the received frame; and receiving the profile of the second terminal by the first terminal and sending a profile of the first terminal to the second terminal.

With regard to step (b), the second terminal may determine a transmission rate necessary for receiving data and for sending the transmission rate to the first terminal.

In addition, step (d) may include the steps of making a list of at least one allocated transmission channel and sending the list to the second terminal by the first terminal; and receiving the transmission channel by the second terminal and setting a parameter containing the transmission channel. Step (d) may further include the steps of sending the determined transmission rate of the transmission channel to the second terminal by the first terminal; and setting a parameter so as to reflect the transmission rate by the second terminal.

In accordance with another exemplary aspect of the present invention, there is provided a method for transmitting data to a second terminal by using visible light as a medium by a first terminal, the method including the steps of (I) connecting a communication link with a second terminal supposed to receive data; (II) determining a transmission rate for transmitting data; (III) allocating a transmission channel of a specific wavelength band within a visible light wavelength band; and (IV) transmitting a data frame to the second terminal via the transmission channel at the transmission rate.

With regard to the exemplary method disclosed in the preceding paragraph, step (I) includes the steps of broadcasting a frame for searching for a second terminal supposed to receive data through visible light; receiving a profile of the second terminal from the second terminal in response to the search frame; and receiving the profile of the second terminal and sending a profile of the first terminal to the second terminal.

Preferably, in step (II), a frame containing a transmission rate necessary for visible light communication is received from the second terminal to determine a transmission rate for transmitting data.

Step (III) includes a step of making a list of at least one allocated transmission channel and sending the list to the second terminal.

Step (III) may further include a step of sending the determined transmission rate of the transmission channel to the second terminal.

Step (IV) includes the steps of setting a parameter containing the transmission rate and the transmission channel; transmitting a frame to the second terminal, the frame containing the data to be transmitted; waiting for an ACK to the transmitted frame containing data for a predetermined period of time; completing data transmission when an ACK is received within the predetermined period of waiting time; and retransmitting data when no ACK is received within the predetermined period of waiting time.

Step (IV) may further include a step of terminating data transmission when the number of times of retransmission exceeds a predetermined number of times.

In accordance with yet another exemplary aspect of the present invention, there is provided a method for receiving data transmitted from a first terminal by using visible light as a medium by a second terminal, the method including the steps of (1) connecting a communication link with the first terminal; (2) sending a transmission rate necessary to receive data to the first terminal; (3) receiving an allocated channel and a transmission rate determined for data transmission from the first terminal and establishing a data reception environment so as to reflect the channel and the transmission rate; and (4) receiving a data frame at the determined transmission rate, the data frame being transmitted from the first terminal through visible light, and sending an ACK to the data frame.

With regard to the aforementioned paragraph, step (1) includes the steps of receiving a frame instructing a search for a terminal from the first terminal; sending a profile of the second terminal in response to the received frame instructing a search for a terminal; and receiving a profile from the first terminal.

In accordance with still another exemplary aspect of the present invention, there is provided a method for transmitting/receiving data between first and second terminals by using visible light as a medium, the method including the steps of (i) connecting a communication link between a first terminal supposed to transmit data and a second terminal supposed to receive data; (ii) determining a data transmission rate to be used for data communication; (iii) allocating a transmission channel of a specific wavelength band within a visible light wavelength band; (iv) establishing a data transmission environment based on consideration of the transmission rate and the transmission channel; and (v) conducting data communication between the first and second terminals with reference to the data transmission environment.

With regard to the aforementioned paragraph, step (i) includes the steps of broadcasting a frame for searching for a second terminal supposed to receive data through visible light by the first terminal; receiving the frame by the second terminal and sending a profile of the second terminal to the first terminal in response to the received frame; and receiving the profile of the second terminal by the first terminal and sending a profile of the first terminal to the second terminal.

Preferably, in step (ii), the second terminal determines a transmission rate necessary to receive data and sends the transmission rate to the first terminal.

Step (iv) includes the steps of making a list of at least one allocated transmission channel and sending the list to the second terminal by the first terminal; and receiving the transmission channel by the second terminal and setting a parameter containing the transmission channel.

Step (iv) may further include the steps of sending the determined transmission rate of the transmission channel to the second terminal by the first terminal; and setting a parameter so as to reflect the transmission rate by the second terminal.

The present invention is advantageous in that the transmission rate necessary to transmit data is recognized based on consideration of the network environment of devices transmitting/receiving data, the type of transmitted data, the characteristics of data, etc., and data is transmitted flexibly at the recognized transmission rate.

In addition, the transmission of data at a transmission rate required by devices transmitting/receiving data contributes to efficient use of limited resources.

BRIEF DESCRIPTION OF THE DRAWINGS

The above and other aspects, features and advantages of the present invention will be more apparent from the following detailed description taken in conjunction with the accompanying drawings, in which.

DETAILED DESCRIPTION

Figure 1:
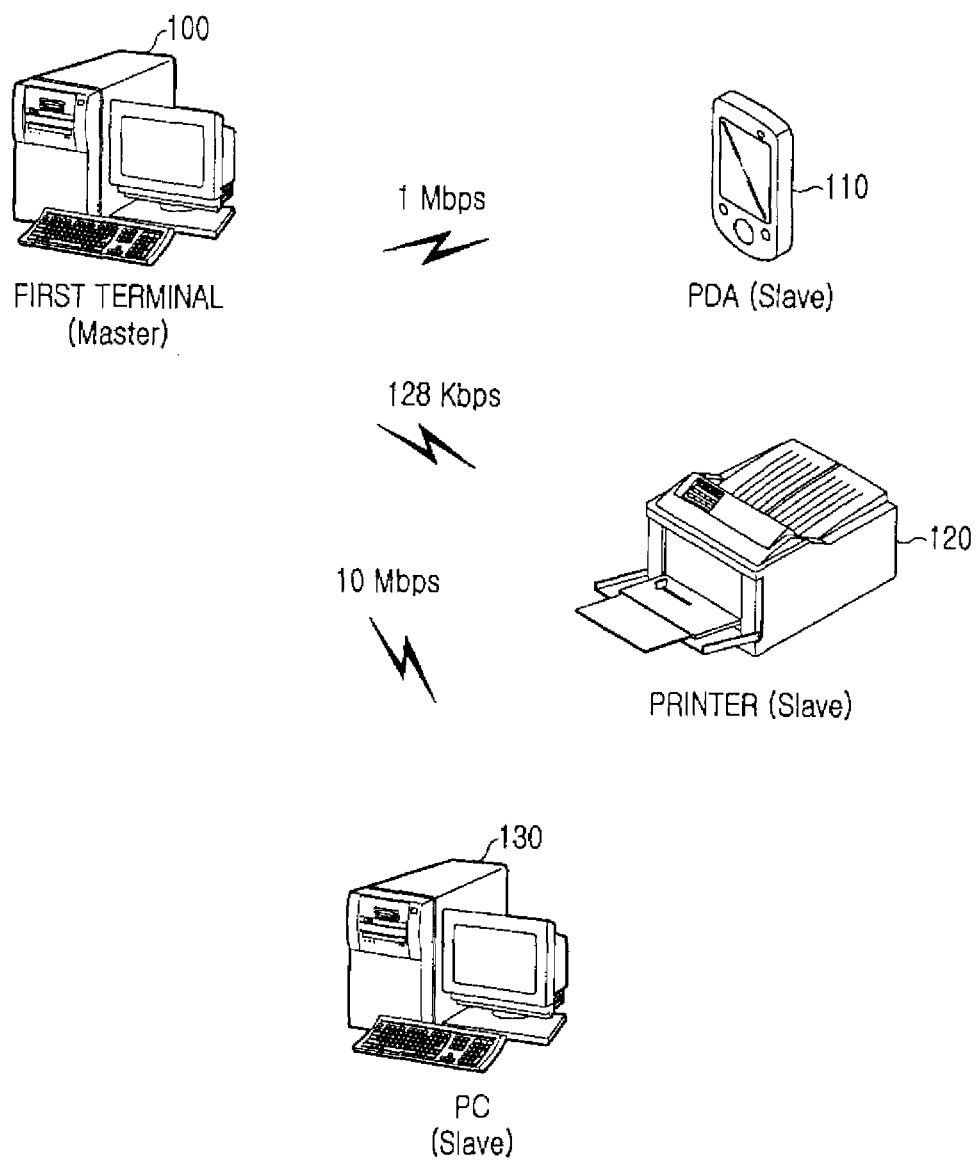
FIG. 1 shows the construction of a wireless communication system using IR rays according to the prior art.

Hereinafter, exemplary embodiments of the present invention will be described with reference to the accompanying drawings. In the following description, the same or similar elements may be designated by the same reference numerals although they are shown in different drawings. Further, in the following description of the present invention, a detailed description of known functions and configurations incorporated herein will be omitted when it may obscure appreciation of the subject matter of the present invention by a person of ordinary skill in the art.

According to an exemplary aspect of the present invention, when it comes to communication using a wireless medium, the transmission rate necessary to transmit data is recognized, and data is transmitted at the recognized transmission rate. Particularly, when the wireless medium is visible light, interpretation of signals outputted through a photodiode, which receives visible light, is enough to realize the characteristics. Therefore, a visible light communication method will be described as an exemplary embodiment of the method for transmitting/receiving data according to the present invention.

However, those skilled in the art can understand that, although a visible light communication method will be exemplified as an exemplary embodiment of the present embodiment, the present invention is not limited to that example, and is applicable to other communication methods capable of realizing the above-mentioned characteristics of the present invention.

Figure 2:
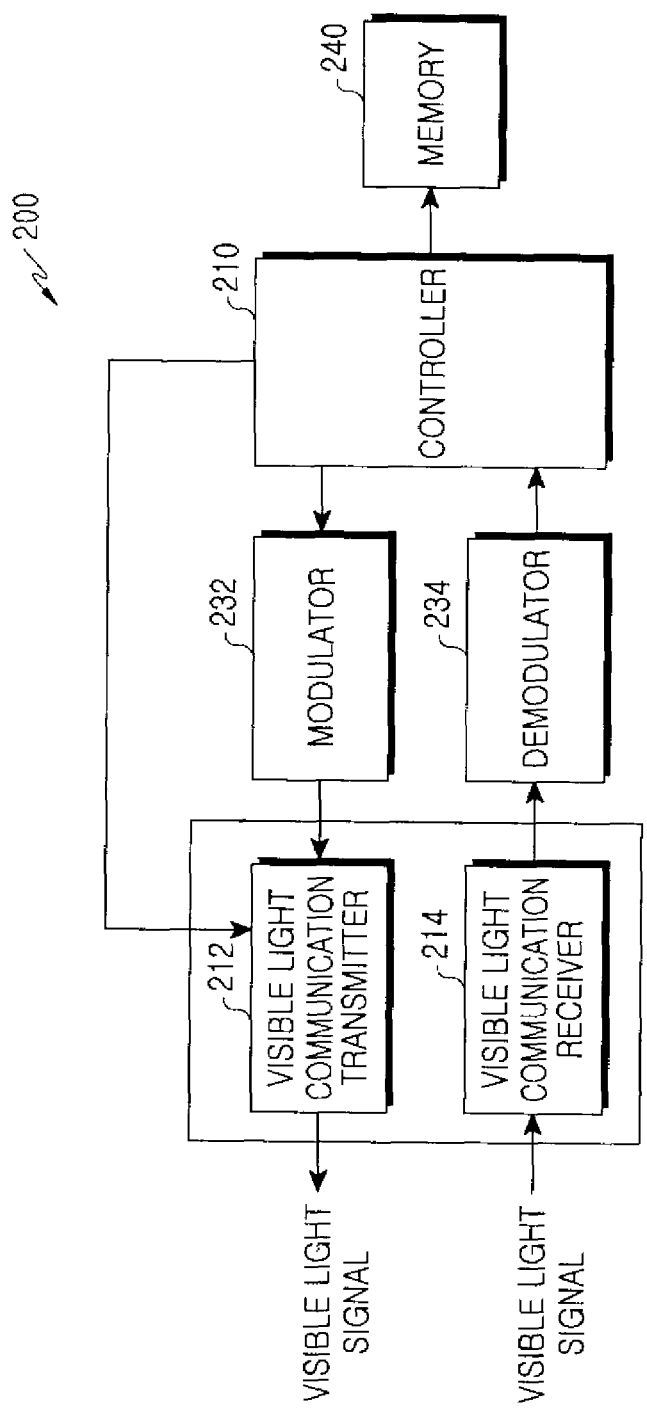
FIG. 2 shows the construction of a communication device, to which a visible light communication method according to an exemplary embodiment of the present invention is applied.

FIG. 2 shows the construction of a communication device 200, to which a visible light communication method according to an exemplary embodiment of the present invention is applied. Referring to FIG. 2, the visible light communication device according to an embodiment of the present invention includes a controller 210, a visible light communication transmitter 212, a visible light communication receiver 214, a modulator 232, and a demodulator 234.

The controller 210 controls the overall operation of the visible light communication device 200, which may function as a device for transmitting or receiving data. Therefore, the controller 210 controls the visible light communication device 200 to operate in a data transmission or reception mode.

When the visible light communication device 200 operates in the data transmission mode, the controller 210 establishes a communication link with another communication device to conduct visible light communication with it, and determines the data transmission rate of the link. During this process, the controller 210 transmits a search frame for searching for another visible light communication device. In response to an ACK from the other visible light communication device, the controller 210 transmits its profile to the other device. The controller 210 also determines the bandwidth of visible light wavelengths for data transmission based on the determined transmission rate so that data is transmitted through the determined bandwidth.

When the visible light communication device 200 operates in the data reception mode, the controller 210 recognizes a search frame, which is broadcast by another communication device to establish a communication link. In response to the search frame, the controller 210 creates a frame, which contains its profile, and sends it. The controller 210 then receives a frame from the other visible light communication device, which is to transmit data, and determines the rate, at which data is to be received, based on consideration of the profile of the visible light communication devices (visible light communication devices that are to transmit and receive data, respectively). When a data frame is being received from a visible light communication device, which is to transmit data, the visible light communication transmitter 212 transmits an ACK and data to the other communication device, and stores data, which is contained in the received data frame, in a memory unit 240.

The modulator 232 and the visible light communication transmitter 212 play the role of transmitting data for visible light communication to the other communication device.

More particularly, the modulator 232 (shown in FIG. 2) operates in the process of transmitting data to the other communication device, creates a data frame containing data to be transmitted according to a predetermined protocol, and outputs the frame. The modulator 232 modulates the created data frame into a signal suitable for visible light communication, and outputs it. The visible light communication transmitter 212 receives the signal from the modulator 232, creates a corresponding visible light signal, and emits it to the outside. The visible light communication transmitter 212 may consist of a light source having a wavelength of approximately 350-700 nm, particularly an LD (Laser Diode), an LED (Light Emitting Diode), or an array thereof.

A visible light signal generated by the other communication device is inputted to the controller 210 via the visible light communication receiver 214 and the demodulator 234. The visible light communication receiver 214 refers to a device for converting the inputted visible light signal into an electric signal and outputting it, and may consist of a PD (Photo Diode) for receiving light from the outside and converting it into an electric signal. The demodulator 234 receives an electric signal from the visible light communication receiver 214, and demodulates the electric signal into a data frame according to the visible light communication scheme. The demodulator 234 recovers data from the demodulated data frame, and outputs the data to the controller 210.

The visible light communication device 200, which has the above-mentioned construction, operates a method for transmitting/receiving data by using visible light communication according to an exemplary embodiment of the present invention by means of operation of the controller 210. The operation of the controller 210 of the visible light communication device according to the present invention will now be described with reference FIG. 3 in particular, which is used to illustrate exemplary steps of a method for transmitting/receiving data by using visible light communication according to the present invention.

Figure 3:
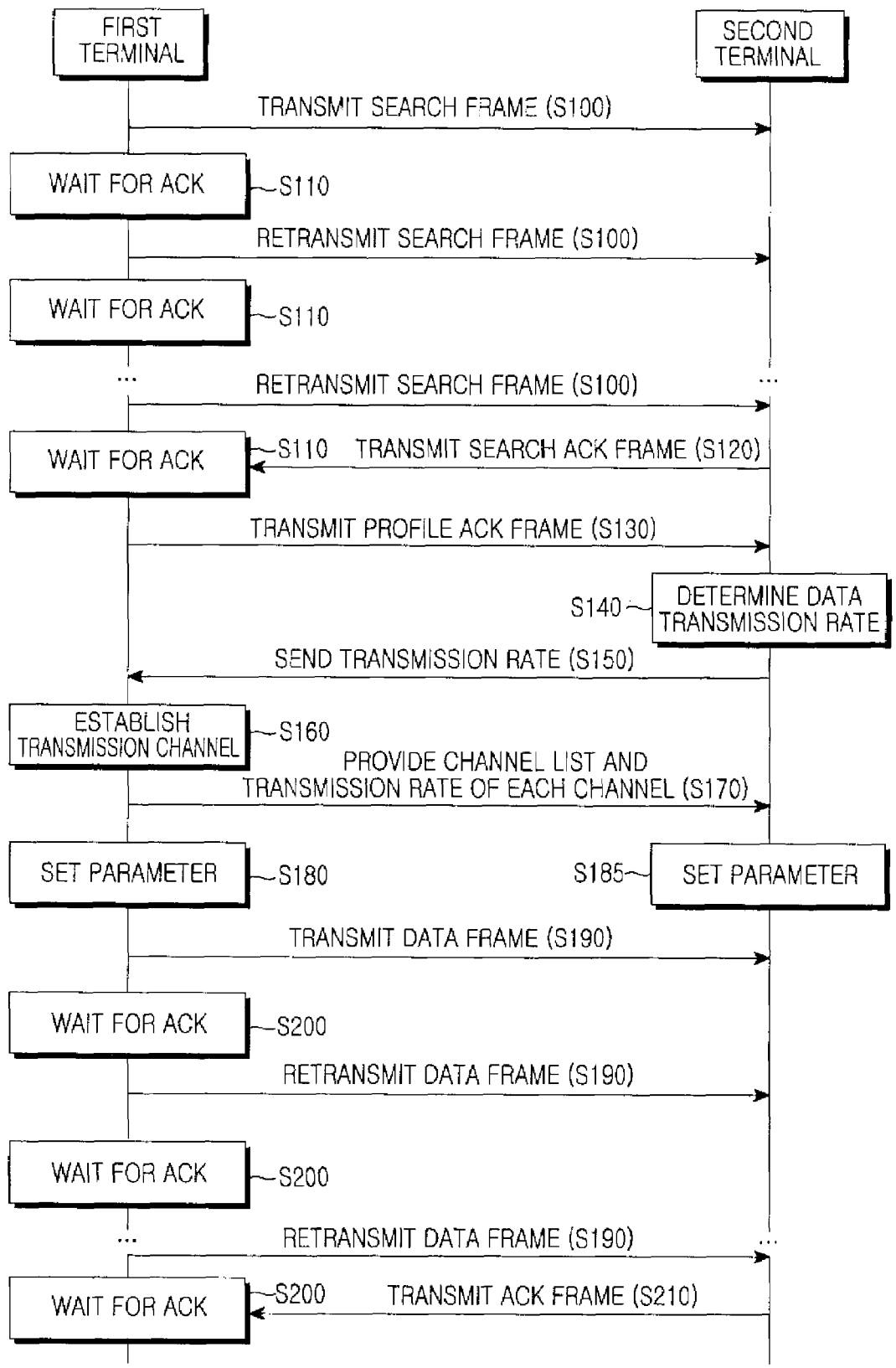
FIG. 3 is a flowchart showing a method for transmitting/receiving data by using visible light communication according to an exemplary embodiment of the present invention.

FIG. 3 is a flowchart illustrating a method for transmitting/receiving data by using visible light communication according to an exemplary embodiment of the present invention.

Referring now to FIG. 3, it will be assumed with regard to the description of a method for transmitting/receiving data by using visible light communication according to an embodiment of the present invention that communication occurs between first and second terminals, particularly that the first terminal transmits a data frame, which contains data to be transmitted, to the second terminal.

The first terminal initially activates a visible light communication mode and broadcasts a search frame for searching for a visible light communication device to the receiving side, i.e. second terminal (S100). The first terminal then stands by for a predetermined period of time waiting for an acknowledgment by the second terminal (S110). Steps S100 and S110 can be repeated a predetermined number of times, which may be varied by the user depending on the communication environment, the characteristics or type of data, etc.

The second terminal receives and recognizes the search frame broadcast by the first terminal at S100, and the second terminal transmits a search ACK frame, which contains an ACK signal in response to the search frame, to the first terminal (S120). The search ACK frame contains information regarding the profile of the second terminal.

Still referring to FIG. 3, when the first terminal receives an ACK signal from the second terminal in the process of repeating steps S100 and S110 a predetermined number of times (S120), the first terminal proceeds to the next step for connecting the first and second terminals (S130). If the first terminal fails to receive any ACK signal from the second terminal until steps S100 and S110 are repeated the predetermined number of times, the first terminal terminates operation (i.e. stops performing the data communication process for a least a predetermined time period).

After receiving the search ACK frame, the first terminal transmits a profile ACK frame to the second terminal in response to the received search ACK frame (S130). The profile ACK frame contains the profile of the first terminal.

In response to receiving the profile ACK frame, the second terminal determines the data transmission rate based on consideration of the profile of the first terminal contained in the profile ACK frame, as well as the profile of the second terminal itself (S140). At (S150) the second terminal sends the transmission rate to the first terminal for subsequent communication.

With continued reference to FIG. 3, the first terminal allocates resources capable of supporting the transmission rate received from the second terminal (S160) to establish the transmission channel. The resources may be wavelengths and bandwidths for respective wavelengths. Particularly, the first terminal allocates a bandwidth of at least one specific wavelength, which can support the transmission rate, as a channel for communication with the second terminal. Then, the first terminal transmits channel information, which contains the list of bandwidths of respective wavelengths of the allocated channel and the transmission rate assigned to the bandwidth of each wavelength, to the second terminal (S170). After step 170, the first and second terminals set parameters necessary for data transmission, respectively, based on consideration of the channel information (S180, S185). The parameters preferably contain the transmission rate.

After establishing a communication environment for transmitting data through the above-mentioned steps, the first terminal transmits a data frame, which contains data to be transmitted by it, to the second terminal (S190), and stands by for a predetermined period of time waiting for an acknowledgement (S200). Steps S190 and S200 are typically repeated for a predetermined number of times. The predetermined period of time and the predetermined number of times may be varied by the user depending on the communication environment, the characteristics or type of data, etc.

The second terminal receives the data frame via the channel, and transmits an ACK frame in response to the received data frame (S210). When the first terminal receives the ACK frame from the second terminal (S201) in the process of repeating steps S190 and S200 a predetermined number of times, the first terminal terminates transmission of the currently transmitted data frame, and proceeds to transmit data of the next frame. If the first terminal fails to receive any ACK signal from the second terminal until steps S190 and S200 are repeated the predetermined number of times (as shown in FIG. 3), and then the first terminal will terminate operation (i.e. conducts no more data communication) if there is still a failure to receive an ACK signal from the second terminal.

As discussed in the above examples, the method for transmitting/receiving data by using visible light communication according to an exemplary embodiment of the present invention is advantageous in that data can be transmitted flexibly in each situation, i.e. according to the network environment of terminals between which visible light communication occurs, the type and characteristics of transmitted data, etc. In addition, limited resources, i.e. limited bandwidths of visible light wavelengths, can be efficiently used for data transmission. While certain exemplary embodiments provided an illustration using visible light communication, it is within the spirit and scope of the invention to also use RF, or infrared communications, as just two possible examples.

While the invention has been shown and described with reference to certain exemplary embodiments thereof, it will be understood by those skilled in the art that various changes in form and details may be made therein without departing from the spirit and scope of the invention as defined by the appended claims.

What is claimed is:

1. A transmitting communication device for transmitting data using wireless visible light, comprising:
   a modulator for creating a data frame containing data to be transmitted to a receiving communication device according to predetermined protocol and outputting the frame, and modulating the created data frame into a signal suitable for visible light communication;
   a visible light communication transmitter for receiving the signal from the modulator and creating a visible light signal according to a predetermined wavelength;
   a controller for establishing a communication link with the receiving communication device for communicating data and receiving a data transmission rate determined by the receiving communication device for transmitting data based on profiles of the transmitting and receiving communication devices for wireless visible light communication and allocating a transmission channel which can support the received data transmission rate within a frequency band for enabling wireless visible light communication; and transmitting channel information containing a list of bandwidths of frequencies of the allocated channel and a transmission rate assigned to the bandwidth of each frequency to the receiving communication device in order for the receiving communication device to set parameters for data transmission based on the channel information; setting parameters necessary for data transmission based on consideration of the channel information and transmitting a data frame using the visible light communication transmitter to the receiving communication device in accordance with the channel information.

2. The transmitting communication device as claimed in claim 1, wherein the controller broadcasts a frame for searching for the receiving communication device by wireless visible light and receives the profile of the receiving communication device transmitted from the receiving communication device in response to the search frame and sends the profile of the transmitting communication device to the receiving communication device.

3. The transmitting communication device as claimed in claim 1, wherein the controller waits for an ACK for a predetermined period of time in response to transmitting the data frame and completes data transmission when the ACK waited for is received within the predetermined period of waiting time and retransmits data when no ACK is received within the predetermined period of waiting time.

4. The transmitting communication device as claimed in claim 3, wherein the controller terminates data transmission when the number of times of retransmission exceeds a predetermined number.

5. A receiving communication device for receiving data using wireless visible light, comprising:
   a visible light communication receiver for converting an inputted visible light signal from a transmitting communication device into an electric signal;
   a demodulator for receiving the electric signal from the visible light communication receiver and demodulating the electric signal into a data frame according to the visible light communication scheme;
   a controller for establishing a wireless visible light communication link with the transmitting communication device and determining a transmission rate for receiving data based on profiles of the receiving communication device and the transmitting communication device and sending to the transmitting communication device the transmission rate for receiving data and receiving from the transmitting communication device channel information containing a list of bandwidths of frequencies of an allocated channel and a transmission rate assigned to the bandwidth of each frequency according to the determined transmission rate; setting parameters for data transmission based on the channel information, and receiving a data frame which is transmitted in accordance with the channel information, the data frame being transmitted from the first terminal through wireless visible light, and sending an ACK in response to receiving the data frame.

6. The communication device as claimed in claim 5, wherein the controller receives from the transmitting communication device a frame instructing a search for the transmitting communication device and sends a profile of the communication device in response to the received frame instructing a search and receives a profile from the communication device.

7. A method for transmitting data to a second terminal by a first terminal using wireless visible light as a medium, the method comprising:
   creating a search frame containing data to be transmitted to the second terminal according to a predetermined protocol and outputting the search frame and modulating the created search frame into a signal suitable for visible light communication by a modulator;
   broadcasting a visible light signal according to a predetermined wavelength by a visible light communication transmitter;
   receiving by the first terminal a profile of the second terminal transmitted from the second terminal in response to the search frame;
   sending a profile of the first terminal to the second terminal;
   receiving a data transmission rate determined by the second terminal for transmitting data based on the profile of the first terminal and the profile of the second terminal for wireless visible light communication;

allocating a transmission channel which can support the received data transmission rate within a frequency band for enabling wireless visible light communication;

transmitting channel information containing a list of bandwidths of frequencies of the allocated channel and a transmission rate assigned to the bandwidth of each frequency to the second terminal in order for the second terminal to set parameters for data transmission based on the channel information;

setting at the first terminal, parameters necessary for data transmission based on consideration of the channel information; and transmitting a data frame to the second terminal in accordance with the channel information.

8. The method as claimed in claim 7, further comprising;

waiting for an ACK for a predetermined period of time in response to transmitting the data frame;

completing data transmission when the ACK waited for is received within the predetermined period of waiting time; and retransmitting data when no ACK is received within the predetermined period of waiting time.

9. The method as claimed in claim 8, further comprising:

terminating data transmission when the number of times of retransmission exceeds a predetermined number.

10. A method for receiving data transmitted from a first terminal to a second terminal by using wireless visible light as a medium, the method comprising:

receiving a visible light signal generated by the first terminal and converting the visible light signal into an electronic signal and outputting the electronic signal via a visible light communication receiver;

demodulating the electronic signal to a data frame according to a visible light communication scheme by a demodulator;

recognizing a search frame indicative of a search for a second terminal according to the data frame;

sending by the second terminal a profile of the second terminal in response to the received search frame;

receiving a profile from the first terminal;

determining a transmission rate for receiving data based on the profile of the first terminal and the profile of the second terminal and sending to the first terminal the transmission rate of the second terminal for receiving data;

receiving from the first terminal channel information containing a list of bandwidths of frequencies of an allocated channel and a transmission rate assigned to the bandwidth of each frequency according to the determined transmission rate by the second terminal;

setting parameters for data transmission based on the channel information; and receiving a data frame which is transmitted in accordance with the channel information.

11. The method as claimed in claim 10, further comprising:

sending an ACK in response to receiving the data frame.

* * * * *